United States Patent [19]

Roberts et al.

[11] Patent Number: 5,503,423
[45] Date of Patent: Apr. 2, 1996

[54] SWING AWAY HITCH ASSEMBLY FOR A TRAILER AND METHOD OF MANUFACTURING SAME

[75] Inventors: Derek C. Roberts, Springfield; Walford A. Anderson, Nixa, both of Mo.

[73] Assignee: Tracker Marine, L.P., Springfield, Mo.

[21] Appl. No.: 259,626

[22] Filed: Jun. 14, 1994

[51] Int. Cl.⁶ .............................. B60D 1/155; B60D 1/40
[52] U.S. Cl. .................................... 280/491.3; 280/479.2
[58] Field of Search .............................. 280/491.3, 491.1, 280/491.4, 478.1, 477, 479.2, 479.3

[56] References Cited

U.S. PATENT DOCUMENTS

| | | | |
|---|---|---|---|
| 2,582,595 | 1/1952 | Leveke | 280/478.1 |
| 4,305,676 | 12/1981 | Wallbank | 403/130 |
| 4,398,742 | 8/1983 | Sanders | 280/491.3 |
| 4,792,153 | 12/1988 | Galdes | 280/479.3 |
| 4,944,525 | 7/1990 | Landry | 280/479.3 |
| 5,011,176 | 4/1991 | Eppinette | 280/479.3 |
| 5,147,095 | 9/1992 | Duncan | 280/491.4 |
| 5,226,657 | 9/1993 | Dolphin | 280/491.1 |
| 5,288,095 | 2/1994 | Swindall | 280/479.2 |
| 5,322,315 | 6/1994 | Carsten | 280/491.3 X |

FOREIGN PATENT DOCUMENTS

| | | | |
|---|---|---|---|
| 1265590 | 4/1968 | Germany | 280/491.3 |
| 1504643 | 3/1978 | United Kingdom | 280/491.3 |
| 1600035 | 10/1981 | United Kingdom . | |

*Primary Examiner*—Kevin T. Hurley
*Attorney, Agent, or Firm*—Kokjer, Kircher, Bowman & Johnson

[57] ABSTRACT

The invention relates to a swing away hitch for a trailer and method of making same. The hitch is intended to allow the trailer to be parked in a building only slightly longer than the boat itself. Boat trailer hitches extend beyond the bow of the boat by some distance, and thus these trailers require a shed longer than the actual boat. To correct this problem, a swing away hitch is installed proximate the boat. According to the present method, the tubular hitch is sandwiched between top and bottom plates. Holes through the hitch and the plates are aligned with one another and a tubular casing is inserted through the holes. Thereafter, the ends of the tubular casings are "swedged" or expanded by pressing bullet shaped pins into opposite ends of the casings. The swedging effect securely fastens the components. Finally, pins are inserted through the casings to mount the swing away hitch on the trailer.

24 Claims, 1 Drawing Sheet

U.S. Patent    Apr. 2, 1996    5,503,423
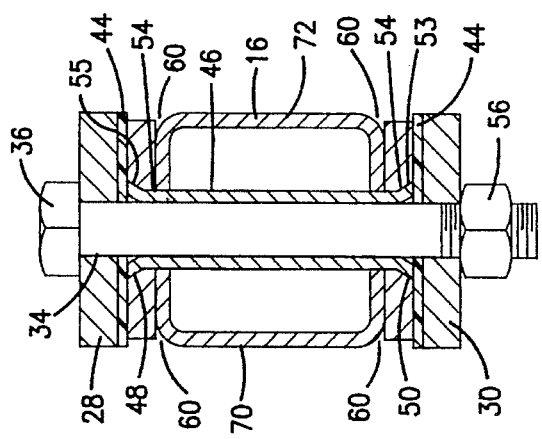
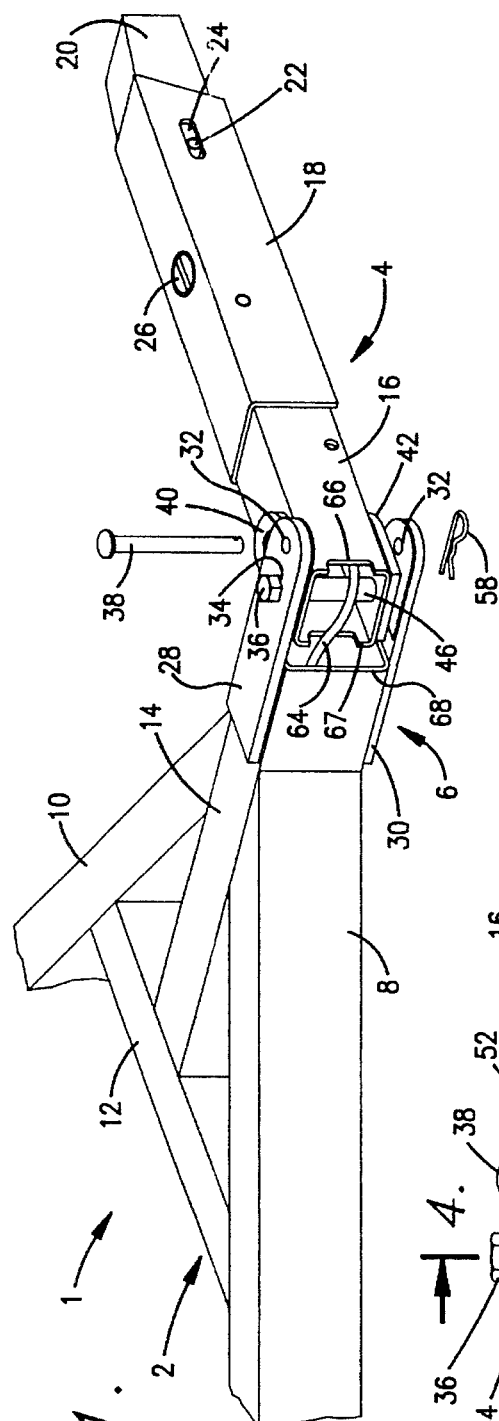
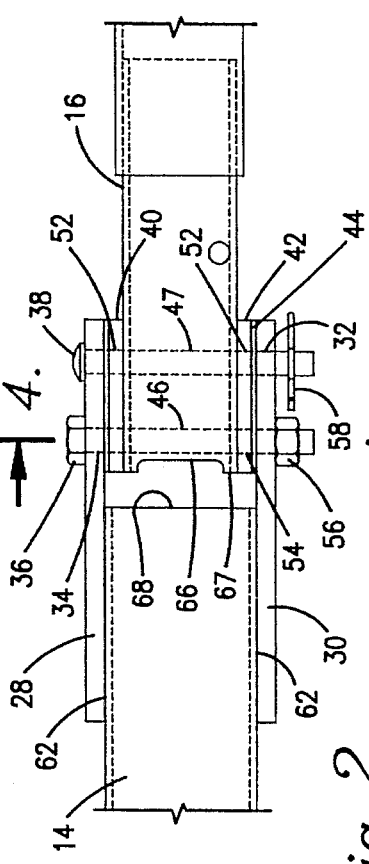
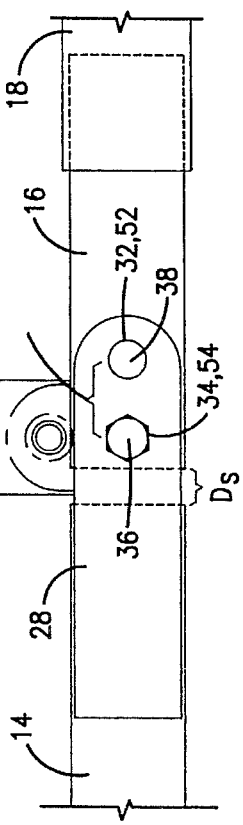

SWING AWAY HITCH ASSEMBLY FOR A TRAILER AND METHOD OF MANUFACTURING SAME

FIELD OF THE INVENTION

The invention generally relates to a hitch assembly for a trailer, wherein the hitch may be pivoted or swung to one side to reduce the storage length of the trailer.

BACKGROUND OF THE INVENTION

In the past, trailer hitches have been proposed, such as those disclosed in U.S. Pat. No. 5,288,095 (Swindall), U.S. Pat. No. 5,147,095 (Duncan), U.S. Pat. No. 5,011,176 (Eppinette), U.S. Pat. No. 4,944,525 (Landry), U.S. Pat. No. 4,792,153 (Galdes), U.S. Pat. No. 4,398,742 (Sanders), U.S. Pat. No. 4,305,676 (Wallbank), U.S. Pat. No. 2,582,595 (Leveke), and G.B. 1 600 035 (Kidd).

The patent to Swindall discloses a trailer hitch having a base plate bolted to a truck bumper and rotatably receiving a housing and a slide bar with a ball bolted thereto. The housing is secured to the base plate and the bumper through a bolt. The slide bar is slidably secured to the housing through a locking pin. The tubular housing has a mounting bore therethrough, a guide slot in its upper wall and an aperture in its lower wall. A trunnion extends through the mounting hole and facilitates arcuate movement of the tubular housing. A telescoping arm is retained within the tubular housing and includes an aperture for alignment with the aperture in the lower wall of the tubular housing. A releasable locking pin is provided for latching the tubular housing when aligned and when the draw bar is retracted along the semi-circular periphery of the base plate.

The patent to Eppinette discloses an adjustable trailer coupling which includes a towing bar arm which is rotatably secured to a hitch. The hitch includes a hitch collar welded thereto and a pivot arm passing through the hitch collar. The pivot arm is rotatably secured to the end of the telescoping arm through a pivot pin. A locking collar is provided to prevent rotation of the arm. Locking means is provided for selectively locking and unlocking the telescopic arm with respect to the towing bar. An articulating arm is provided having one end connected to the trailer hitch and the other end pivotally connected to the telescopic arm. The pivotally connected end of the articulating arm has a locking pin receiving hole which aligns with a locking pin receiving hole of the telescopic arm. An anti-pivot collar is selectively positioned with respect to the pivot point to either encircle or not encircle the pivot point to permit or restrain pivotal movement between the articulating arm and the telescopic arm. Means is also provided for positioning the anti-pivot collar with respect to the pivot point for selectively positioning the anti-pivot collar.

The patent to Landry discloses a self-locking trailer hitch having a frame which receives a housing that is pivotally coupled to a swing bar. The housing is integrally formed with a pin protruding upward therefrom. The pin confines the swing bar for rotation about the pin's vertical axis for horizontal swing movement. The amount of swing is limited by an abutment. A pin is provided to release the swing bar from the housing and provide for lateral rotation thereof. The housing, frame and swing bar each have apertures disposed in alignment when the swing bar is centered on the housing and the housing is in an extended position. The locking pin is mounted on the swing bar for extension through these apertures when they are aligned to lock the hitch in a towing position.

The patent to Galdes discloses a trailer hitch which is inserted within a housing. The hitch bar is provided with a front segment and a rear segment pivotally connected to one another for rotation about a vertical axis along a pivot shaft. The front segment is slidably received within the housing. A locking pin is provided to lock the hitch bar to the housing when the hitch bar is in a first position. When in use, the shaft is removed and the bolts are pulled outward so that the inner end position of the bolts are released from the recesses in the rear end of the front segment. Thereafter, the hitch is moved rearwardly until the rear segment can be pivoted about the vertical axis of the shaft. Once the ball is connected to the rear segment, the hitch bar is moved inwardly of the housing until the bolts reengage the hitch bar. Then, the locking pin is inserted to further lock the hitch bar of the housing.

The patent to Kidd discloses an extendable drawbar having two parts, the first of which is tubular and fixed to the vehicle. The second part includes top and bottom flat limbs which are pivotally mounted to the top and bottom surfaces of the first part. The top and bottom limbs include elongated slots with a fixed pivot pin passing through the slots and through a corresponding hole in the first part.

However, these conventional systems have met with limited success as they are overly complex and require excessive manufacturing steps and/or complex operation to adjust the trailer. Also, the conventional hitches provide limited strength, and thus, typically represent a weak point within the trailer hitch.

A need remains in the industry for an improved swing away hitch. The object of the present invention is to meet this need.

SUMMARY OF THE INVENTION

It is an object of the present invention to provide a swing away hitch which is easily moved between, and secured in, transporting and storage positions.

It is another object of the present invention to provide a swing away hitch which is easily manufactured by extending tubular channels through the multi-layered hitch and flaring opposite ends of each channel to secure the assembly together.

It is another object of the present invention to provide a swing away hitch which is extremely rigid and easily manipulated while being connected to a vehicle.

It is another object of the present invention to provide a hitch that allows the trailer to be stored in a building having a length that is only slightly longer than that of the bed section of the trailer.

It is another object of the present invention to reduce wear within the hitch by providing an anti-wear plate between the pivoting limbs of the hitch.

In summary, the invention relates to a swing away hitch for a trailer, such as (but not limited to) a boat trailer. The hitch assembly includes a stationary base, formed integrally with the trailer bed, and a pivoting arm formed with the hitch on its outermost end and rotatably mounted on the stationary base at its innermost end. The stationary base is constructed from a square channel-shaped section of the trailer hitch that is sandwiched between and fixedly secured to top and bottom outer support plates. An outer half of each support plate includes holes axially aligned with one another. The pivoting arm is formed with a square channel core, the innermost end of which is sandwiched between top and bottom inner support plates. The inner support plates and the channel core include holes punched therethrough and aligned with one another. A tubular sleeve is inserted through the holes. Thereafter, the ends of the tubular sleeve are "swedged" or expanded by pressing bullet shaped pins into opposite ends of the casings. The swedged sleeves securely fasten the plates to the core. The portion of the pivot arm including the inner plates is received between the outer plates and oriented such that corresponding holes align. A rotating pin is fixedly inserted through the back hole to serve as the pivot point, while a mounting pin is temporarily inserted through the front hole. When the mounting pin is removed, the pivoting arm is movable, but when inserted, the pivoting arm is fixed in one of a towing position and a storage position.

BRIEF DESCRIPTION OF THE DRAWINGS

The objects and features of the invention noted above are explained in more detail with reference to the drawings, in which like reference numerals denote like elements, and in which:

FIG. 1 illustrates a perspective view of a swing away hitch according to the present invention whereby the hitch is in a storage position;

FIG. 2 illustrates a side planar view of the present invention with the swing away hitch in a transport position;

FIG. 3 illustrates a top planar view of the present invention with the swing away hitch in a transport position; and FIG. 4 illustrates an end sectional view taken along line 4—4 in FIG. 2 illustrating the cross-section of structure of the present invention.

DETAILED DESCRIPTION OF THE INVENTION

FIG. 1 illustrates the present invention generally designated by the reference numeral 1 and including a trailer section 2 and a swing away tongue 4 pivotally mounted to one another via a swing away hitch assembly 6. The trailer section 2 is constructed in an A-shape with side supports 8 and 10 converging at an apex and cross member 12 extends therebetween to provide lateral support at a point remote from the apex. At the apex, the side supports 8 and 10 join a base member 14 at an intermediate point. The base member 14 is rigidly secured at one end to the swing hitch assembly 6 and at the opposite end to a side of the cross member 12. Each of the side supports and cross and base members 8-14 are constructed with a square channel-shaped cross-section and formed of a rigid material, such as aluminum or metal. Alternatively, the cross-sections of the side supports and cross and base members 8-14 may be any other well known supporting configuration, such as a circular or oval cross-section.

The swing away tongue 4 includes a square channel pivoting arm 16 having one end pivotally mounted to the trailer section 2 and an opposite end received within a rectangular collar 18. The collar 18 receives, within its opposite end, a hitch section 20 which is hitched to the vehicle to pull the trailer. The hitch 20 is slidably received within the collar 18 and includes catch pins 22 extending outward from opposite sides thereof. The catch pins 22 slide within a slot in opposite sides of the collar 18 to limit the motion of the hitch 20, thereby preventing the hitch 20 from completely disengaging the collar 18. The hitch 20 includes an internal latching mechanism wherein the hitch 20 is fixedly secured to the collar 18 when a locking member 26 is in a first position. The locking member 26, may be rotated to an unlocked position to allow the hitch 20 to slide within the collar 18, thereby enabling easy connection to a bumper.

The swing away hitch assembly 6 includes top and bottom outer support plates 28 and 30 (FIG. 2) which are fixedly mounted upon, and extend beyond, the outer end of base member 14. The top and bottom outer support plates 28 and 30 are located on the top and bottom surfaces of the base member 14. The outer support plates 28 and 30 are constructed of flat rigid material, such as sheet metal, with a width substantially equal to that of the base member 14. The outer support plates 28 and 30 may be mounted to the base member 14 in any known manner, such as welding and the like. Outermost ends of the outer support plates 28 and 30 include rounded corners for safety. The support plates 28 and 30 include aligned front and back holes 32 and 34 extending therethrough. The front and back holes 32 and 34 are aligned with their centers upon a line extending along the longitudinal center of the support plates 28 and 30.

The rear most portion of the pivoting arm 16 is formed with top and bottom inner plates 40 and 42 securely mounted on upper and lower surfaces thereof. The pivoting arm 16 includes notches 66 upon opposite sides thereof to ensure that a brake line 64 is not pinched between either side 67 of the positioning arm 16 and either side 68 of the base member 14 when in a towing position. The top and bottom inner plates 40 and 42 have a width substantially equal to that of the pivoting arm 16 with a flat outermost end extending along the outer end of the pivoting arm 16. An opposite end of each inner plate 40 and 42 is constructed in an arcuate pattern substantially equal to the outermost contour of the outer support plates 28 and 30. The top and bottom inner plates 40 and 42 function as shims between the top and bottom outer support plates 28 and 30 and the pivoting arm 16. The inner plates 40 and 42 and the pivoting arm 16 also cooperate to provide a wide working area and to distribute the longitudinal and transverse forces about a large surface area.

The inner plates 40 and 42 and the pivoting arm 16 include front and back holes 52 and 54 therethrough aligned with one another and located along a longitudinal axis of the pivoting arm 16. The holes 52 and 54 in the inner plates 40 and 42 are formed with tapered outermost portions 53 and 55. The front and back holes 52 and 54 (FIG. 4) receive tubular sleeves 46 and 47, respectively, which extend through the core of the pivoting arm 16 and end flush with the outermost surfaces of the top and bottom inner plates 40 and 42. The tubular sleeves 46 and 47 include upper and lower ends 48 and 50 which are flared or swedged outward into the tapered portions 53 and 55. The tubular sleeves 46 and 47 provide additional support for the top and bottom outer support plates 28 and 30 to supplement the side walls 70 and 72 of the pivoting arm 16. The upper and lower ends 48 and 50 are flared during production to retain securely the inner plates 40 and 42 upon the pivoting arm 16.

As illustrated in FIG. 3, the front holes 32 and 52 in the inner and outer plates are spaced apart from the back holes 34 and 54 by a distance $D_H$ which equals the spacing between a center of the back holes 34 and 54 and a closest outer edge of the front holes 32 and 52. The distance $D_H$ is greater than the distance $D_W$ which equals half the width of the inner plates 40 and 42 and the pivoting arm 16. These spacings enable the positioning pin 38 to be inserted while the pivoting arm 16 is in the storage position.

As illustrated in FIG. 3, the end of the pivoting arm 16 is located a distance $D_S$ from the end of the base member 14 to prevent contact therebetween when the swing away tongue 4 is pivoted about the pivot pin 36.

Anti-wear plates 44 (FIG. 4) are positioned between the inner plates 40 and 42 and the outer plates 28 and 30. The anti-wear plates 44 may be constructed of a resilient, low friction material, such as polyethylene and the like. As illustrated in FIG. 1, the anti-wear plates 44 are secured to the inner surfaces of the outer support plates 28 and 30, and constructed with a contoured pattern substantially following that of the outer plates 28 and 30. The anti-wear plates 44 provide a smooth surface for the inner plates 40 and 42 to pivot upon, thereby reducing friction and lengthening the life of the swing away hitch assembly 6.

The back tubular sleeve 46 and back holes 34 and 54 receive a pivot pin 36 which is secured in place with a nut 56. The front tubular sleeve 47 and front holes 32 and 52 receive a positioning pin 38 which is releasably secured thereto, such as with a cotter key 58 (FIG. 1).

As illustrated in FIGS. 2 and 3, the pivoting arm 16 is aligned along the same longitudinal axis as the base member 14, such that the front holes 32 and 52 on the inner and outer plates 28, 30, 40 and 42 align in a towing position. The positioning pin 38 is inserted to retain the assembly in this position. When it is desirable to store the trailer with the swing away tongue 2 in a storage position, the positioning pin 38 is removed. Next, the swing away tongue 2 is pivoted about the mounting pin 36, until it forms a substantially right angle with the base member 14. Once in its storage position, the position pin 38 is re-inserted to retain the pivoting arm 16 at this right angle.

Attention now is turned to the method by which the present invention is constructed. Referring to FIGS. 1 and 4, once the outer plates 28 and 30, the inner plates 40 and 42, and the pivoting arm 16 are formed, holes 32, 34, 52 and 54 are drilled or punched into each component. The holes 52 and 54 in the inner plates 40 and 42 are constructed with chamfered edges proximate the outermost sides thereof to provide tapered regions 53 and 55 about each hole's periphery. Next, the inner plates 40 and 42 are positioned on the top and bottom surfaces of the pivoting arm 16 and corresponding front and back holes are aligned. Thereafter, the front and back tubular sleeves 46 and 47 are inserted through the aligned holes until opposite ends of each sleeve are substantially flush with the outermost surfaces of the top and bottom inner plates 40 and 42. Next, the upper and lower edges 48 and 50 of each tubular sleeve 46 and 47 are flared or swedged outward until they securely press against the chamfered edges 53 and 55 of the holes. This swedging operation securely fixes the top and bottom inner plates 40 and 42 to the top and bottom surfaces of the pivoting arm 16. This swedging operation may be effected in a press with bullet shaped tools being pressed into opposite ends of each sleeve 46. Optionally, the inner plates 40 and 42 may be additionally welded along outermost edges to the pivoting arm 16 at seams 60.

The anti-wear plates 44 are located between the inner and outer plates and are secured to the inner surfaces of the outer plates 28 and 30, such as through adhesive and the like. The outer plates 28 and 30 are secured along seams 62 to the outermost end of the trailer base member 14. Once the outer plates 28 and 30 are secured to the trailer base member 14 and the inner plates 40 and 42 are secured to the swing away tongue 4, these two sections are combined by aligning the corresponding front and back holes 32, 34, 52 and 54 and inserting the pivoting and positioning pins 36 and 38. The top and bottom inner plates 40 and 42 cooperate with the tubular sleeves 46 and engage the entire working surface of the top and bottom outer plates 28 and 30 in order to distribute lateral, longitudinal and transverse forces therebetween across the entire top and bottom surfaces of the pivoting arm 16. The brake line 64 is extended through the base member 14 into and through the swing away tongue 4.

During operation, for storage, the pivoting pin 38 is removed and the swing away tongue 4 is pivoted to either side. Thereafter, the positioning pin 38 is reinserted as is the cotter key 58. The positioning pin 38 abuts against the side of the pivoting arm 16, thereby retaining the swing away tongue 4 in its storage position (as illustrated in FIG. 1). When it is desirable to tow the trailer, the positioning pin 38 is again removed and the swing away tongue 4 is rotated to a towing position (as illustrated in FIGS. 2 and 3). The locking member 26 is rotated to an unlocked position thereby enabling the hitch 20 to slide within the collar 18. Once the hitch 20 is secured to the vehicle which will pull the trailer, the locking member 26 is rotated to a locked position. Thereafter, the vehicle is maneuvered forward or backward to reengage the locking mechanism within the collar 18. The positioning pin 38 may be reinserted before or after the hitch 20 is secured to the bumper of the vehicle.

Optionally, the hitch assembly may be reversed such that the outer support plates are secured to the top and bottom of the pivoting arm, while the inner support plates are secured to the top and bottom of the base member. The sleeves would be inserted within the base member proximate the holes extending therethrough.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A trailer hitch comprising:

a base member, having a rear end adapted to be secured to a trailer and a front end projecting forward with respect to said trailer;

a pivoting arm, having a front end adapted to be secured to a hitch and having at least two holes therethrough;

at least one support plate for supporting said pivoting arm relative to said base member, said support plate having at least two holes therethrough aligning with said holes in the pivoting arm;

at least one securing sleeve, extending through said holes in said pivoting arm and said support plate, for securing said support plate to said pivoting arm;

pivoting means for pivotally securing said base member to said pivoting arm; and positioning means for fastening said pivoting arm in a towing position and a storage position.

2. A trailer hitch according to claim 1, wherein said second support means includes top and bottom inner support plates located proximate said rear end of said pivoting arm and secured to top and bottom surfaces of said pivoting arm, said top and bottom support plates having said at least two holes therethrough which are aligned with said holes in said pivoting arm.

3. A trailer hitch according to claim 1, wherein said securing means includes tubular sleeves, each of which extends through one of said holes in said second support means and said pivoting arm, said tubular sleeves having flared outer ends that fixably engage, and retain, said second support means in an abutting relation with said pivoting arm.

4. A trailer hitch according to claim 1, wherein said first support means includes top and bottom outer support plates located proximate, and secured to, said front end of said base member, said top and bottom outer support plates extending beyond said front end of said base member to receive said pivoting arm.

5. A trailer hitch according to claim 1, wherein said first and second support means include inner and outer support plates affixed to top and bottom surfaces of said pivoting arm and said base member, respectively, said inner and outer plates sliding against one another when said pivoting arm is rotating from said towing position to said storage position.

6. A trailer hitch according to claim 1, wherein said pivoting arm and said first and second support means include front and back holes having centers aligned along a longitudinal axis thereof.

7. A trailer hitch according to claim 1, wherein said securing means includes tubular sleeves and said second support means includes top and bottom inner plates secured to top and bottom surfaces of said pivoting arm by said tubular sleeves extending through said holes.

8. A trailer hitch according to claim 1, wherein said pivoting and positioning means include pivot and positioning pins, respectively, and wherein said at least two holes, through said support means and said pivoting arm, includes front and back holes which receive said positioning and pivot pins, respectively.

9. A trailer hitch according to claim 8, wherein a distance between a center of said back hole and an outer edge of said front hole is equal to, or greater, than half a width of said pivoting arm to enable said positioning pin to be inserted after said pivoting arm is rotated to said storage position.

10. A trailer hitch according to claim 1, further comprising a non-friction anti-wear plate located between, and securely fastened to one of, said first and second support means.

11. A trailer hitch according to claim 1, wherein said pivoting arm includes side walls having notches in rear ends thereof to prevent said side walls from interfering with a brake line, extending through said base member and said pivoting arm, when said pivoting arm is located in a storage position.

12. A trailer hitch according to claim 1, wherein the pivoting arm is affixed at an angle perpendicular to the base member when fastened in the storage position.

13. A method of manufacturing a trailer hitch, comprising the steps of:

securing first support plates to a front end of a base member, said base member having a rear end adapted to be secured to a trailer;

providing at least two holes within a pivoting arm, proximate its rear end, said pivoting arm having a front end adapted to be secured to a hitch;

providing an equal number of holes in said first support plates and in second support plates;

aligning said second support plates with respect to said pivoting arm such that corresponding holes in said second support plate and said pivoting arm align with one another;

inserting sleeves through said holes in said second support plates and said holes in said pivoting arm;

flaring outer ends of said sleeves to affix said second support plates to said pivoting arm;

aligning said first and second plates; and inserting a pivot pin into a corresponding one of said holes.

14. A method of manufacturing a trailer hitch according to claim 13, further comprising the step of providing a chamfered edge about said holes and along one side of said second support plates to provide a tapered surface for receiving said flared edges of said sleeves.

15. A method of manufacturing a trailer hitch according to claim 13, said holes said first support plates are aligned along a longitudinal axis of said base member and said holes in said second support plates and said pivoting arm are aligned along a longitudinal axis of said pivoting arm.

16. A method of manufacturing a trailer hitch according to claim 13, wherein said first and second support plates and said pivoting arm include front and back holes aligned along a longitudinal axis of said hitch.

17. A method of manufacturing a trailer hitch according to claim 16, further comprising the step of spacing said front and back holes apart by a distance equal to, or greater than, half a width of said pivoting arm to enable a positioning pin to be inserted in one of said holes when rotated to a storage position.

18. A method of manufacturing a trailer hitch according to claim 13, further comprising the step of securing an antiwear non-friction layer of material to an inside surface of one of the first and second support plates. 18.

19. A method of manufacturing a trailer hitch according to claim 13, further comprising the step of forming notches in rear ends of side walls of said pivoting arm.

20. A method of manufacturing a trailer hitch according to claim 13, further comprising the step of welding the second support plates to said pivoting arm.

21. A swing away hitch assembly comprising:

a base member having a rear end adapted to be secured to a trailer and a front end projecting forward with respect to said trailer;

a pivoting arm having a front end adapted to be secured to a hitch;

top and bottom outer support plates affixed to one of said base member and said pivot arm;

top and bottom inner support plates affixed to an opposite one of said base member and said pivot arm, said opposite one of said base member and said pivoting arm and said inner and outer support plates having at least front and back holes therethrough aligned with another; said inner support plates being received between said outer support plates and slidable engaging one another along an arcuate path having a center at said back hole;

securing means, extending through said holes in said inner plates and through a center of said opposite one of said base member and said pivoting arm, for securing said second support means to said opposite one of said base member and said pivoting arm; and pivoting means for pivotally securing said base member to said pivoting arm; and positioning means for fastening said pivoting arm in a towing position and a storage position.

22. A trailer hitch comprising:

a base member, having a rear end adapted to be secured to a trailer and a front end projecting forward with respect to said trailer;

a pivoting arm, having a front end adapted to be secured to a hitch and having holes therethrough;

first and second support means for supporting said pivoting arm relative to said base member, each of said first and second support means having corresponding holes therethrough aligned with said holes through said pivoting arm, said first and second support means slidably engaging one another along an arcuate path about a center of one of said holes, said first and second support means including front and 14 back holes having centers aligned along a longitudinal axis thereof;

securing means, extending through said holes in said pivoting arm and said second support means, for securing said 18 second support means to said pivoting arm; and means for pivotally securing said base member to said pivoting arm to enable said pivoting arm to rotate between a towing position and a storage position and for affixing said pivoting arm in said towing and storage positions.

23. A trailer hitch comprising:

a base member adapted to be secured to a trailer;

a pivoting arm adapted to be secured to a hitch;

at least one inner support plate and at least one outer support plate, mounted to said pivoting arm and said base member, for supporting said pivoting arm relative to said base member, said inner support plate and said pivoting arm each having at least one hole extending therethrough and aligned with one another;

means, within said at least one hole in said pivoting arm and said at least one hole in said inner support plate, for securing said inner support plate to said pivoting arm;

means for pivotally securing said base member to said pivoting arm; and means for fastening said pivoting arm in one of a towing position and a storage position.

24. A method of manufacturing a hitch, comprising the steps of:

forming a pivoting arm with at least one hole therethrough, said pivoting arm adapted to be secured to a hitch;

aligning at least one support place, having at least one hole therein, with said pivoting arm such that corresponding holes in said support plate and said pivoting arm align with one another;

inserting a sleeve into said aligned holes in said support plate and said pivoting arm;

rigidly affixing said support plate to said pivoting arm with the sleeve; and pivotally attaching said support plate to a base.

* * * * *